United States Patent [19]

Smith et al.

[11] Patent Number: 5,029,939
[45] Date of Patent: Jul. 9, 1991

[54] ALTERNATING PRESSURE PAD CAR SEAT

[75] Inventors: Jack E. Smith; John F. Hoying, both of Dayton, Ohio

[73] Assignee: General Motors Corporation, Detroit, Mich.

[21] Appl. No.: 417,529

[22] Filed: Oct. 5, 1989

[51] Int. Cl.$^5$ .............................................. A47C 27/18
[52] U.S. Cl. ...................................... 297/284; 128/33; 297/DIG. 8
[58] Field of Search .......... 297/284, DIG. 3, DIG. 8, 297/452; 5/455, 456, 457, 453; 128/33

[56] References Cited

U.S. PATENT DOCUMENTS

| | | | |
|---|---|---|---|
| 3,297,023 | 1/1967 | Foley | 128/33 |
| 3,595,223 | 7/1971 | Castagna | 128/33 |
| 3,613,671 | 10/1971 | Poor et al. | 128/33 X |
| 3,730,588 | 5/1973 | Braun | 297/284 |
| 3,770,315 | 11/1973 | Smittle et al. | 297/284 |
| 3,879,776 | 4/1975 | Solen | 5/458 |
| 3,919,730 | 11/1975 | Regan | 128/33 X |
| 4,524,762 | 6/1985 | Schulman | 297/284 X |
| 4,555,140 | 11/1985 | Nemoto | 297/284 X |
| 4,852,195 | 8/1989 | Schulman | 297/DIG. 8 |

Primary Examiner—Peter A. Aschenbrenner
Attorney, Agent, or Firm—Ernest E. Helms

[57] ABSTRACT

The invention provides a vehicle seat construction and method of utilization of the same. The inventive vehicle seat construction alternately supports the vehicle seat occupant upon different portions of the vehicle occupant's body. The above massaging effect relieves the vehicle seat occupant of possible discomfort realized after extended driving periods. Additionally, the inventive seat structure provides the alternating support feature while allowing the vehicle seat to function normally in the absence of the power to the pneumatic system which energizes the alternating suport feature.

2 Claims, 5 Drawing Sheets

ALTERNATING PRESSURE PAD CAR SEAT

FIELD OF THE INVENTION

The field of the present invention is that of vehicle seats. More particularly the field of the present invention is of pneumatic vehicle seats. An understanding of vehicle pneumatic seats can be gained by a review of Horvath et al U.S. Pat. No. 4,707,027 commonly assigned.

DISCLOSURE STATEMENT

During prolonged seating periods, continuous long term pressure can restrict blood flow through the capillaries in the skin of a seat occupant. The above-noted restriction causes the seat occupant to experience discomfort and can sometimes provoke the seat occupant to periodically squirm in the seat to give himself relief. It is desirable to provide a vehicle seat which can be more comfortable during long term travel in a vehicle.

It has also been known in the medical arts to provide inflatable pillow type bedding for immobilized patients. The typical medical bedding is fabricated from a multiple layered polymeric sheeting which is dielectrically bonded to create at least two separate sealed pneumatic passages. Valving is provided to alternately inflate different portions of the bedding thereby giving a massaging feeling to the patient and alternating the points of maximum pressure on the patient's skin to help minimize the possibility of bed sores.

Attempts were made to incorporate the features of medical pneumatic bedding into pneumatic vehicle seats. However the medical pneumatic devices were not suitable for use in the vehicle seating environment. One severe drawback of trying to utilize the prior medical pneumatic devices in seating is that the shape of the vehicle seat was radically altered when the bladder(s) of the seat were in a non-inflated condition. Furthermore, the proximity of the bladder(s) to the top surface of the vehicle seat often adversely affected the permeability of the seating surface to moisture from the seat occupant.

DISCLOSURE STATEMENT

To overcome the above and other noted problems the present invention has brought forth, the present invention provides a vehicle pneumatic seat which in a preferred embodiment has a series of complaint first pneumatically sealed cushion cells or pads. The first cells are intermingled with at least a series of second substantially similar cells. Means are provided to procure a pressure differential between the first and second cushion cells in an alternating fashion thereby alternating the pressure points on which the vehicle seat occupant is supported within the seat. However, in the absence of pressure the seat functions like a normal seat.

It is an object of the present invention to provide a vehicle seat construction and method of utilization thereof of a pneumatic vehicle seat for alternately supporting a vehicle seat occupant upon a plurality of pressure pads.

Other objects, desires and advantages of the present invention will become more apparent to those skilled in the art as the nature of the invention is better understood from the accompanying drawings and detailed description.

DETAILED DESCRIPTION OF THE DRAWINGS

Figure 1:
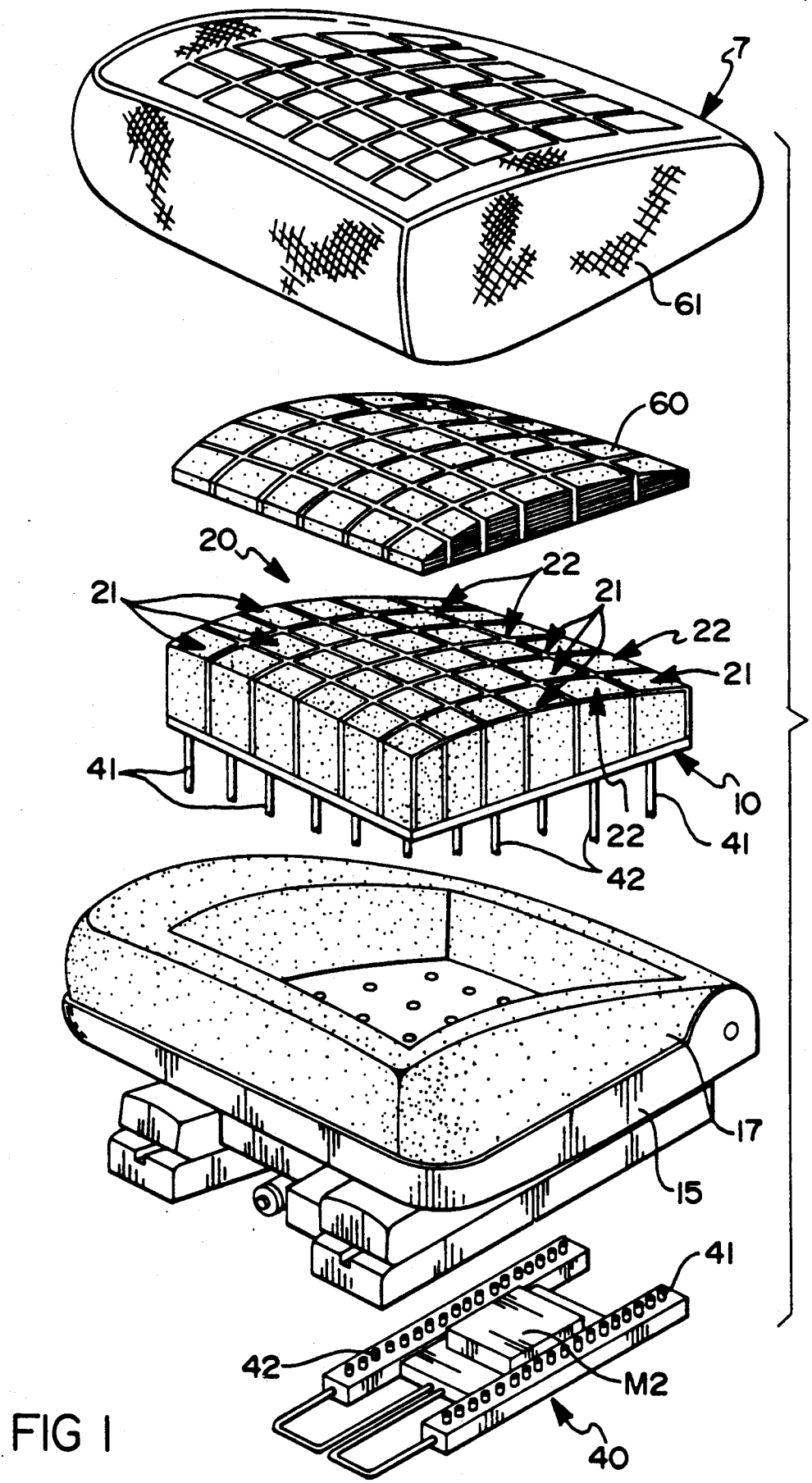
FIG. 1 is a perspective exploded view of a construction of a preferred embodiment vehicle seat according to the present invention.

Referring to FIG. 1, the vehicle seat construction 7, according to the present invention, has four major components. The first component is the base 10. The base 10 is typically bonded or otherwise fixably attached to a vehicle seat support structure 15. Surrounding the base is a foamed "donut" bun 17.

Figure 2:
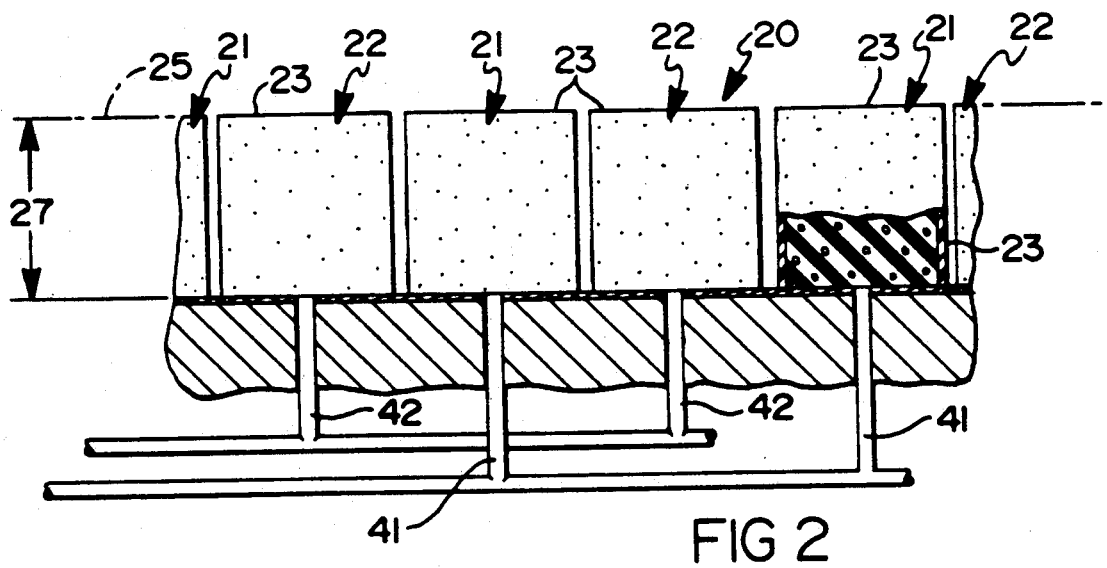
FIGS. 2, 3 and 4 are schematic views are illustrating operations of the cushion cells, illustrated in FIG. 1.
Figure 3:
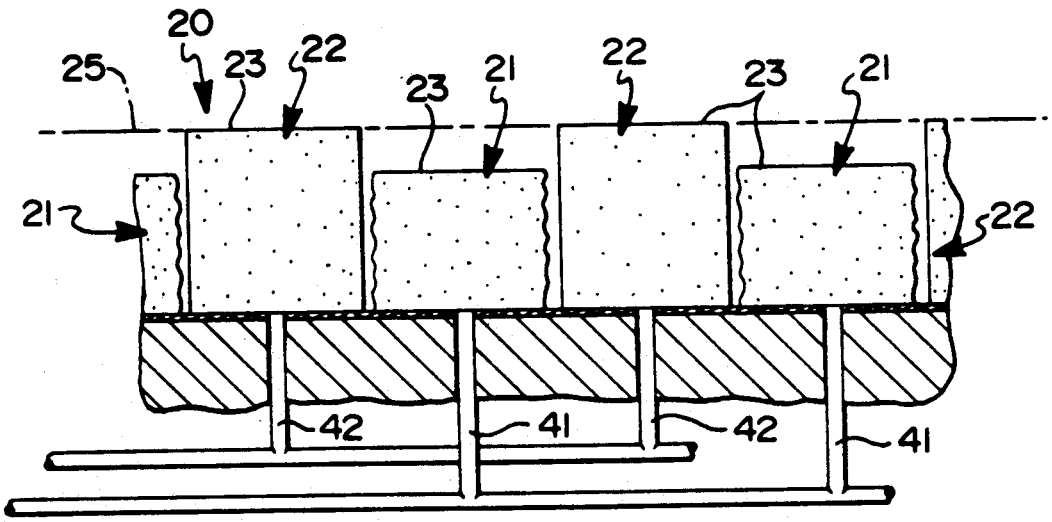
Figure 4:
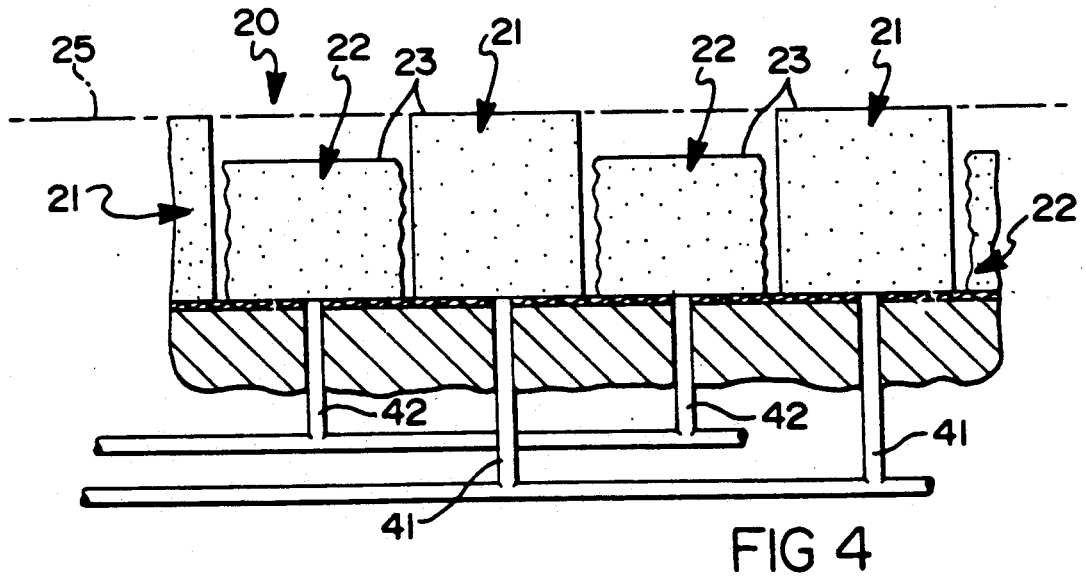
Figure 5:
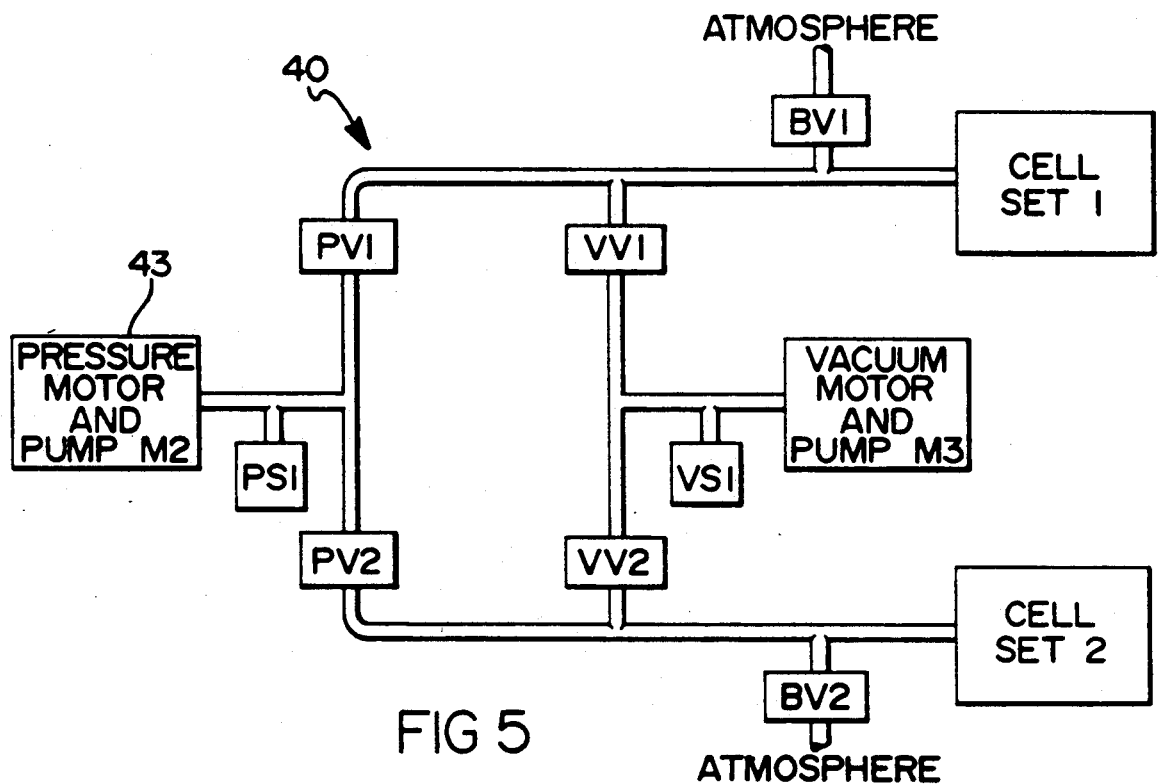
FIG. 5 is a schematic view of the pneumatic system of the present invention.

Adjacent to and on top of the base 10 supporting the seat occupant away from the base 10 is the second major element of a plurality of first cushion cells 21. Referring additionally to FIGS. 2, 3 and 4, the first cells 21 support the seat occupant at a loading height 27 which is approximately 50% or more of the cell height in the free state. The first cells 21 are intermingled with the third major element of the present invention, and a plurality of substantially identical second cushion cells 22. The forth element is the means to alternately create a pressure differential 40 between the first 21 and second 22 cells.

Captured between the first 21 and second 22 cushion cells and the seat occupant (not shown) is a permeable air spacer filler material 60 such as Uniroyals Spacer Fabric Style No. 620 or Takagi Chemicals Inc. material called Curl Lock. The filler 60 is serrated to conform with the cells 20 and allows moisture from the seat occupant to escape.

Surrounding the filler 60, cells 20 and base 10 is a conventional fabric seat cover 61 which is preferably intended to match the pattern of the cells 20.

Referring additionally to FIGS. 2-4, the cells 20 are made up of a compliant material such as an elastomeric permeable foam which can support the seat occupant independent of any inflation of the cells 20. The cells 20 are pneumatically sealed along their exterior 23 typically by a silicone coating such as Dow, Corning sealant 734. Each cell 20 is connected with a fluid line. The first cells 21 are connected with a first fluid line 41. The second cells 22 are connected with a second fluid line 42.

The alternating pressure differential means 40 includes a motor and pneumatic pump M2 which may be located under the seat. In other applications the pneumatic pump M2 will be remotely located and used to supply other pneumatic accessories of the vehicle. The preferred power source is a DC powered linear piston air pump.

Figure 9:
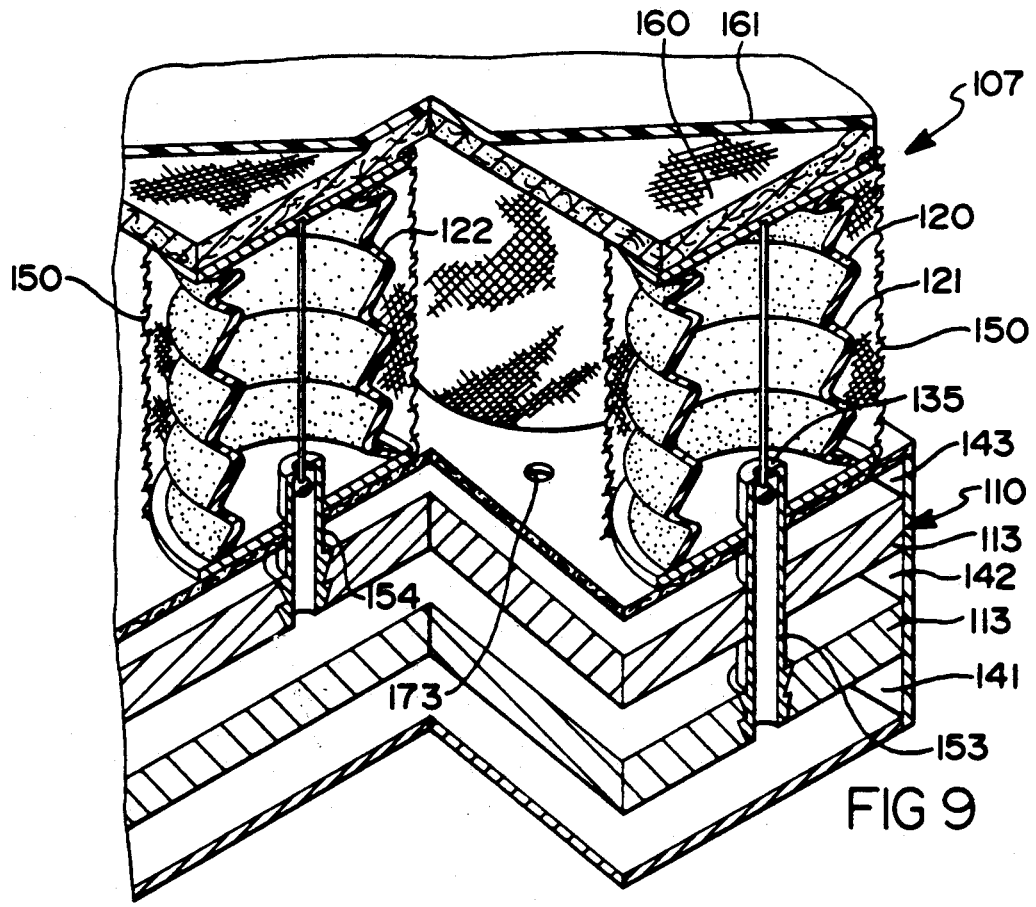
FIG. 9 is a sectional view of an alternate preferred embodiment of the present invention.

FIG. 9 illustrates an embodiment which is an alternative to the embodiment illustrated in FIG. 1. A polyester elastomer cushion cell 120 is fabricated from blow molded Hytrel. The cell 120 has a connector fitting which will plug into a three layered base 110. The fitting provides the only air access into the bellows cell 120. By the nature of the Hytrel material, the bellows will act as a compliant spring. With the air in the bellows cell 120 at atmospheric pressure, the bellows cell 120 will have a given spring rate and free height. With the air pressure at a controlled level, either higher or lower, the bellows cell 120 will have a different spring rate and free height. Cell 121 of the first set has a connector fitting 153 which is fluidly connected with the first level 141. Cell 122 of the second set is fluidly connected with second level 142. A third level 143, connected with a separate motor and pump M1 is fluidly connected with a third level 143.

Attached to the bellows top is a breathable fabric cover 161 and spacer filter 160. Also, covering the bellows cell is an optional air permeable cloth bag 150 which will reduce any friction between adjoining cells during relative motion. Additionally, the bag 150 can be used to limit the bellows expansion (height) when the seat is unoccupied and unloaded. The above can be an advantage because the seat will not be unduly distorted on the expansion side so as to damage the seat construction by stretching.

A valving mechanism 135 is provided to close off the sealed chamber of the cushion cells 120. Therefore, the pump 43 will not have to work as hard if the system is turned on when the seat is unoccupied.

Additionally there are ventilation holes 173 to provide cooling air to remove moisture from the seat occupant. The air for the ventilation holes passes through the third level 143. A separate motor and pump M1 is provided to provide air for the ventilation holes.

Referring additionally to FIGS. 5-8 and 10 a 12 volt source of power (vehicle battery) is connected to the system by activation of either manually operated switch TS1 or manually operated switch TS2. In the above case, if switch TS2 is activated, the motor and pump M1 will begin to supply compressed air through the ventilation air holes 173 of the seat. If switch TS1 is left deactivated then the atmospheric air passes through the break valves BV1 & BV2 and the seat operates as a static "independent coil spring" seat.

If switch TS1 is activated, then the break valves BV1 & BV2 will close and block atmospheric air from the seat. Also, now the "alternating pressure pad" and "controlled static pressure" options are exposed to the 12 volt source of power. Either one or the other of these options may be operated at a time by selecting one of the selector switch settings of SS101 or SS102.

Figure 6:
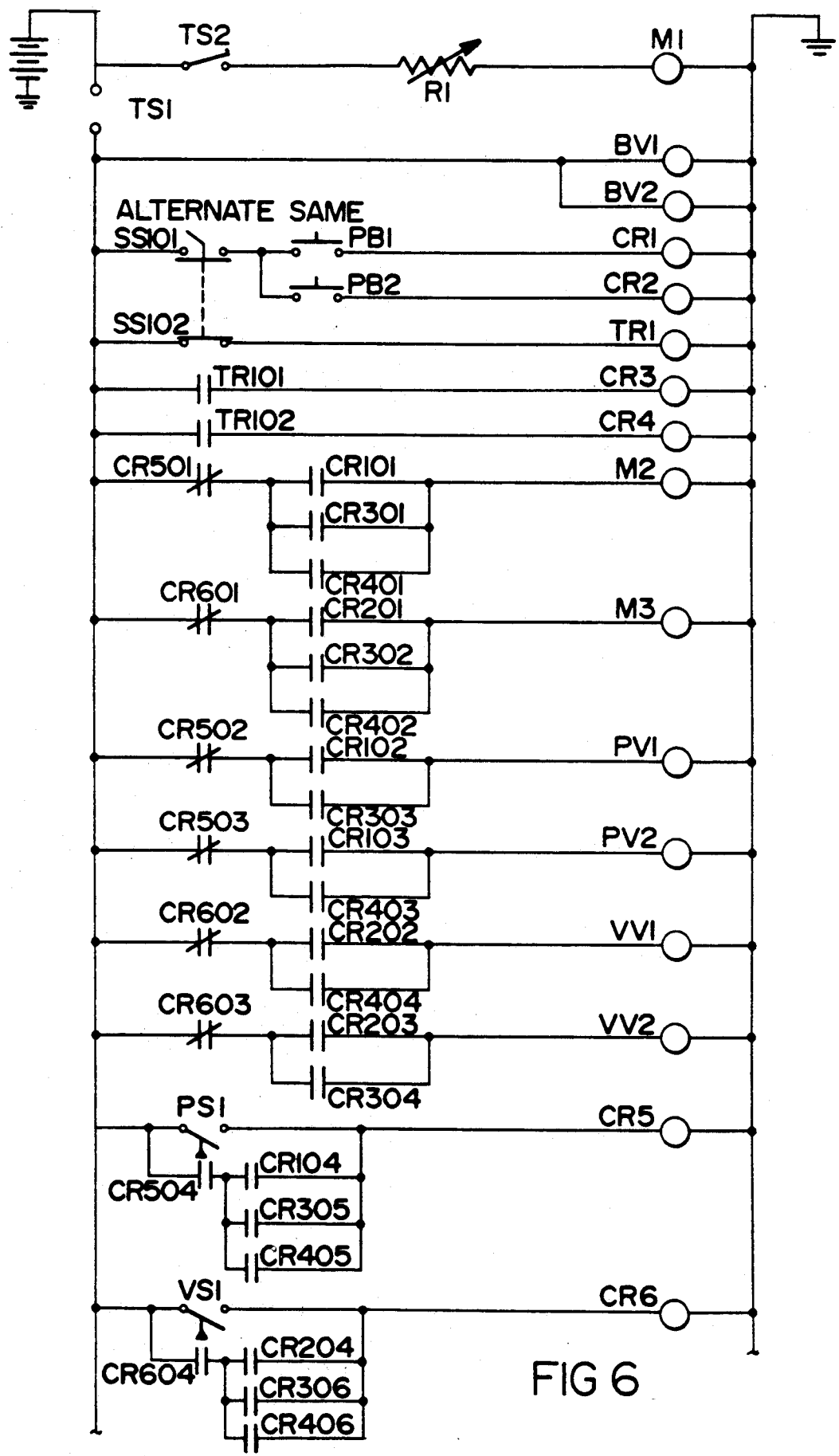
FIG. 6 is an electrical control schematic of the control system for the pneumatic system of the present invention.

For example if SS101 contact is closed then the "controlled static pressure" portion of the system is accessed (labeled "same" on SS101 in FIG. 6). If PB1 is then activated, the coil to relay CR1 will become energized, and all of the contacts to relay CR1 will be switched.

The motor and pump M2 will become energized through contacts CR501 & CR 101. The motor and pump M2 will begin supplying compressed air to both cells 121 (set 1) and cells 122 (set 2), by supplying compressed air through valves PV1 & PV2 (see FIGS. 5 and 6). Valve PV1 is energized (and therefore open) through contacts CR502 & CR102. Valve PV2 is energized (and therefore open) through contacts CR502 & CR103.

Pump and motor M2 will continue to supply compressed air until either PB1 is released or until the pressure in the system reaches a maximum. This maximum is determined by pressure switch PS1 and is set for 0-10 pounds. If PB1 is held closed until the preset maximum pressure is reached, then PS1 will close. This will energize the coil of relay CR5. Also, relay CR5 will remain energized through contacts CR502 & CR104 until pushbutton PB1 is released. In the meantime, contacts CR501, CR502, and CR503 will open up and motor M2 and valves PV1 and PV2 will become deenergized. This will maintain the pressure in cell sets 1 and 2 at a maximum.

In a similar manner, if the vacuum pushbutton PB2 is activated, then relay CR2 is energized. This will in turn energize motor and pump M3 and valves VV1 and VV2. This will evacuate the air from both cell set 1 and cell set 2. Also, and in a similar manner as the static pressure case, a vacuum will continue to be pulled until either PB2 is released or until the vacuum reaches a maximum. This maximum is determined by vacuum switch VS1 and is set for 0-15 inches of mercury.

If selector switch SS102 is chosen the "alternate" portion of the circuit is energized and the seat system will automatically alternate pressure and vacuum in the cell sets. Specifically, when contact SS102 is closed, timer coil TR1 is energized and begins rotating through 360 degrees of mechanical rotation. As TR1 rotates, contacts TR101 & TR102 will be closed and opened. The portion of the cycle where the contacts can be closed and opened is adjustable. TR101 and TR102 can also be adjusted independently of each other.

Figure 10:
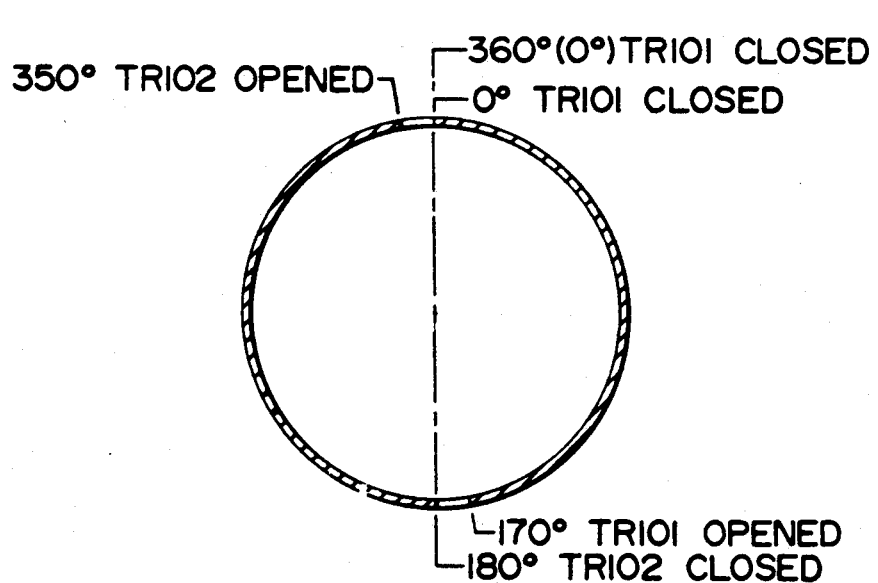
FIG. 10 is a control timing chart for the control system shown in FIG. 6.

In this example, contact TR101 is set to close when the timer is in the 0 to 170 degrees of its rotation, and contact TR102 is closed when the timer is in the 180 to 350 degrees of its rotation (see FIG. 10). Timer TR1 has an automatic reset feature and continually cycles.

Referring to FIG. 10, the timer begins its first cycle at the 0 degrees position of the timer. This closes contact TR101, which in turn energizes relay CR3. This, in turn, causes the motor and pump M2 and M3 to begin moving air. CR303 and CR304 contacts also energize valves PV1 and VV2. The above causes compressed air to be pumped into cell set 1 and air to be evacuated from cell set 2. Cell set 1 will continue to be filled until PS1 reaches its preset maximum value. When PS1 reaches its preset maximum value, relay CR6 will energize and will then deenergize motor and pump M3 and vacuum valve VV2.

Cell set 1 is held at maximum pressure and cell set 2 is held at maximum vacuum until the 180 degrees mechanical rotation point is reached on the timer (see FIG. 11). At the 170 degrees mechanical position of the timer, contact TR101 opens and the CR3 coil is deenergized. At the same time, relay coils CR5 and CR6 become deenergized.

When the timer reaches the 180 degrees position, contact TR102 will close and energize relay CR4. This will, in turn, energize motor and pump M2 and motor and pump M3. It will at the same time energize valves PV2 and VV1. This will allow cell set 1 to be evacuated of air and cell set 2 to be pressurized.

This filling and evacuating action to the seat will continue until the preset maximum valves are reached and PS1 and VS1 actuate. When PS1 and VS1 actuate, pump and motor M2 and pump and motor M3, and valves PV2 and VV1 will be deenergized. This will maintain a maximum pressure level in cell set 2 and maximum vacuum level in cell set 1 until the 360 degrees (0 degrees) mechanical position of the timer is encountered.

At the 350 degrees mechanical position of the timer, contact TR102 opens and deenergizes relay CR4. This in turn deenergizes relays CR5 and CR6. When the 360 degrees (0 degrees) mechanical position of the timer is reached, cell set 1 is pressurized and cell set 2 is evacuated and the entire process of "alternating pressure pad" seat is repeated.

The preferred basic sequence is shown in FIGS. 2, 3, 4, and 8. In FIG. 2 the two sets of cells have their air lines open to ambient and the cells are loaded (as if a driver was sitting on the seat) to a given height 27. FIG. 3 shows cell set 1 pressurized to such a point as to support the load, without the help of cell set 2, while maintaining the original height of the load. That is, the driver did not rise or fall during the shifting of load from equal distribution of load between cell sets 1 and 2 to the entire load being supported by cell set 1. FIG. 4 shows the reverse of the situation of FIG. 3.

Figure 8:
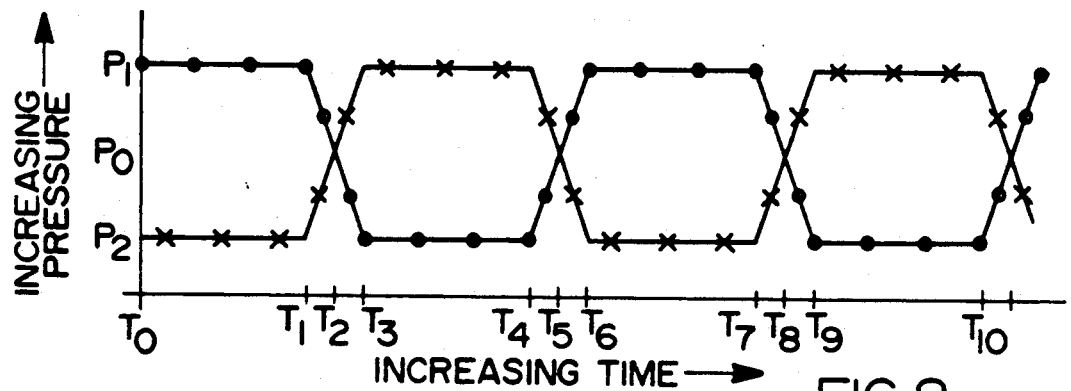

FIG. 8 is a graph of the pressure in the cell sets vs. time. P0 is the ambient pressure. P1 is the required pressure in either cell set which corresponds to a normal loaded seating level. When supporting the entire load at normal loaded seating height. P2 is the vacuum level in cell set 2 necessary to cell set 2 to assure that the set does not support any load. The time between T1 and T3 represents the transition pressure which allows cell set 2 to support the entire load between times T3 and T4 while cell set 1 is contacted from supporting load during that time period. Time T2 is the preferred timing such that the pressure in cell set 1 and cell set 2 correspond to the ambient pressure loaded height so that the driver is not raised or lowered during the pressure transition. This relationship must be controlled.

The preferred cycle timing is between 15 seconds and two minutes, though it could be adjustable by the driver to suit his/her own comfort.

Figure 7:
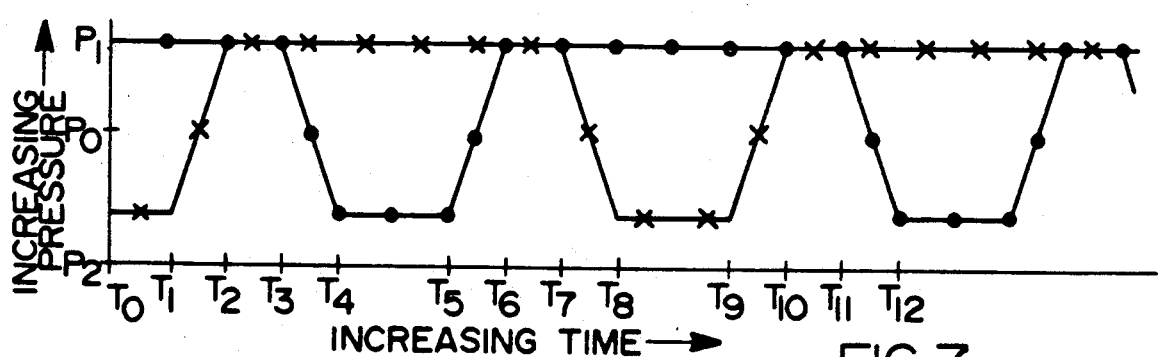
FIGS. 7 and 8 are time vs. pressure graphs illustrating the operation of the pneumatic system.

If desired, the control system of FIG. 6 can be modified to give an output for the first and second sets, as shown in FIG. 7, to provide an overlap of pressurization of the cell sets 1 and 2.

An advantage of the present inventive seat is that when the pump motor is shut off, the natural compliance maintains the shape and appearance of the seat the same. Another advantage of the present inventive seat is that the cells act independently and activation of one set of cells for the most part does not cause deformation of the top surface of an adjacent cell of the other set. In other words a seat occupant skin will not experience a surface stretch due to movement of the cells as would be experienced if sitting on a dielectrically bonded polymeric sheeting type medical bedding as previously described.

While a few of the embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A seat construction for supporting the occupant of a vehicle, said seat construction in combination comprising:
   a tri-leveled base having noncomingled first, second and third fluid passages for said respective levels, said first level having apertures for a controlled leakage;
   a plurality of first compliant cushion cells connected with said base for supporting said seat occupant away from said base, said first cells being placed adjacent said third level with a connection fitting allowing fluid communication between said first cell interior and first level;
   a second plurality of second cushion cells for supporting said seat occupant away from said base independently from said first cushion cells, said second cells being substantially identical to said first cushion cells locationally intermingled with said first cushion cells in a set pattern and being adjacent said third level with connecting fitting allowing fluid communication with said second level; and
   an air permeable pad for supporting said seat occupant above said first and second cells;
   means to alternately create a pressure differential between said first and second level cells by applying pressurized air to one of said levels and a vacuum to said other cushion levels whereby said seat occupant is alternately supported away from said base along different locations of said seat occupant and means to supply pressurized air to said third level.

2. A seat construction for supporting an occupant of a vehicle, said seat construction in combination comprising:
   a base;
   a plurality of first polymeric bellow cushion cells having a void interior, said first cells being connected with said base and being of a compliant material for supporting said seat occupant away from said base in a free state, said first cells having a pneumatically sealed exterior and said first cells having a first fluid line connected with the interior of said cells, said first cells also having valving means to prevent fluid communication with said first fluid line when said seat is unoccupied;
   a plurality of second polymeric bellow cushion cells having a void interior, said second cells being connected with said base and said second cushion cells being made from a compliant material for supporting said seat occupant away from said base in a free state independently of said first cushion cells, and said second cells being locationally intermingled with said first said cells, said second cushion cells having a pneumatically sealed exterior and an interior connected to a second fluid line, said second cells also having valving means to prevent fluid communication with said second fluid line when said seat is unoccupied; and
   means connected with said first and second fluid lines to alternately create a pressure differential between said first and second cells whereby the pressure placed against said seat occupant forming one of said first or second cells is alternately greater than the pressure placed against said seat occupant by the other said cells and said seat occupant is supported on different locations of said seat.

* * * * *